United States Patent [19]

Sakashita et al.

[11] Patent Number: 5,550,414
[45] Date of Patent: Aug. 27, 1996

[54] MOTOR

[75] Inventors: Hiroshi Sakashita; Masayuki Katagiri, both of Nagano, Japan

[73] Assignee: Kabushiki Kaisha Sankyo Seiki Seisakusho, Nagano, Japan

[21] Appl. No.: 163,699

[22] Filed: Dec. 9, 1993

[30] Foreign Application Priority Data

Dec. 10, 1992 [JP] Japan ................... 4-090583 U
Dec. 10, 1992 [JP] Japan ................... 4-090584 U

[51] Int. Cl.⁶ .................. H02K 7/14; H02K 7/10
[52] U.S. Cl. ..................... 310/67 R; 310/75 R
[58] Field of Search ................. 310/67 R, 75 R, 310/272; 242/390.8; 403/262, 345, 381; 474/197, 903; 360/96.3

[56] References Cited

U.S. PATENT DOCUMENTS

| | | | |
|---|---|---|---|
| Re. 34,268 | 1/1993 | Müller | 310/67 R |
| 3,035,788 | 5/1962 | Horberg | 403/381 |
| 3,618,411 | 12/1969 | Rottweiler | 474/903 |
| 3,785,584 | 1/1974 | Crelin, Jr. | 403/381 |
| 4,227,423 | 10/1980 | Crowe | 474/903 |
| 4,371,817 | 2/1983 | Müller | 310/46 |
| 4,423,359 | 12/1983 | Hashimoto | 310/92 |
| 4,649,306 | 3/1987 | Yamashita | 310/90 |
| 4,839,551 | 6/1989 | Tomisawa | 310/90 |
| 4,982,130 | 1/1991 | Cap et al. | 310/268 |
| 4,998,905 | 3/1991 | Martin | 474/903 |

Primary Examiner—Clayton E. Laballe
Attorney, Agent, or Firm—Sughrue, Mion, Zinn, Macpeak & Seas

[57] ABSTRACT

A motor includes a rotor case having a rotor magnet so as to face a stator core; a rotating shaft as fixed through a hole formed in the center of the rotor case; and a pulley having a center hole fixedly secured to a distal end portion of the rotating shaft projecting beyond the hole in the rotor case, the pulley being fixed to the rotor case.

17 Claims, 8 Drawing Sheets

MOTOR

BACKGROUND OF THE INVENTION

1. Field of the invention

This invention relates to a motor for use with a video tape recorder and the like. More particularly, the invention relates to the construction of a pulley on such motor.

2. Related art

Figure 25:
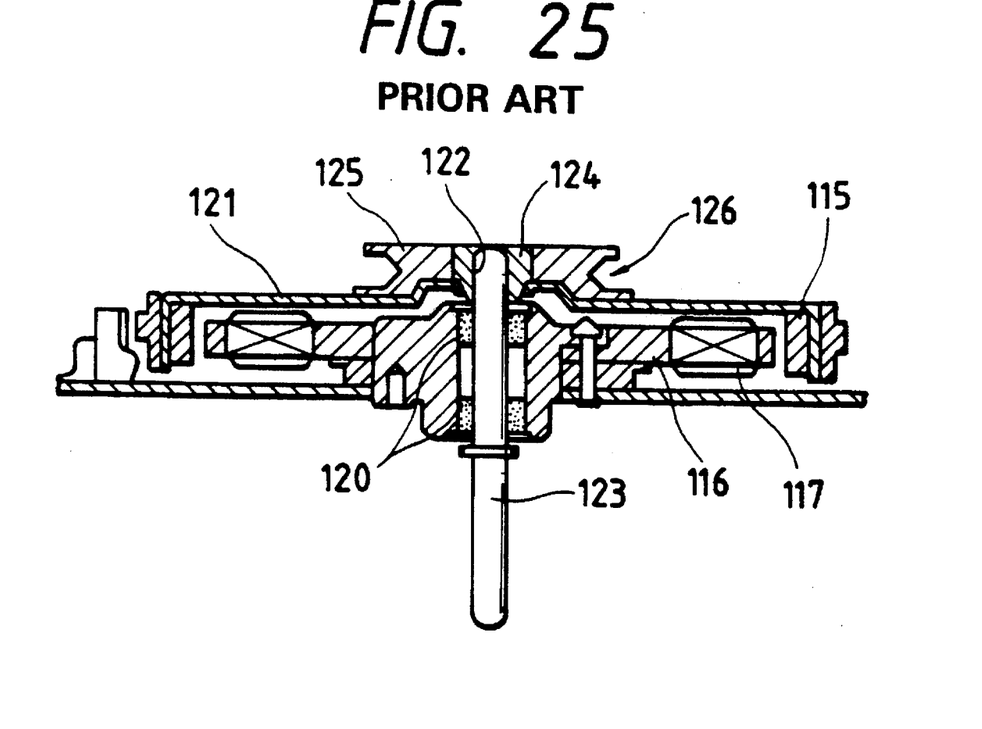
FIG. 25 is a cross-sectional view showing a prior art motor.

A brushless capstan motor is an example of the motors that are conventionally used to drive tape on a video tape recorder and the like. A prior art example of this brushless capstan motor is shown in FIG. 25. As shown, a rotor case 121 in the form of a shallow cup is furnished with a cylindrical boss portion 124 in the center. A rotating shaft 123 is pressed into a cylindrical hole 122 through the boss portion 124 and the shaft is integral with the rotor case 121. A rotor magnet 115 is fitted on the inner surface of the peripheral wall of the rotor case 121 in such a way that it faces the salient poles of a stator core 116 with a certain clearance being provided. Therefore, if coils 117 wound around the salient poles of the stator core 116 are supplied with an electric current in a controlled manner, the rotor magnet 115 is energized and both the rotor case 121 and the rotating shaft 123 are driven to rotate. A pulley 125 is fixed in engagement with the outer circumference of the boss portion 124. A peripheral groove 126 having a rectangular cross section is formed around the entire circumference of the pulley 125 and a belt (not shown) is stretched in the peripheral groove 126. As the rotor case 121 and the rotating shaft 123 rotate, the pulley 125 also rotates, transmitting the rotating force to the drive mechanism for the reel mount and the like via the belt.

Figure 26:
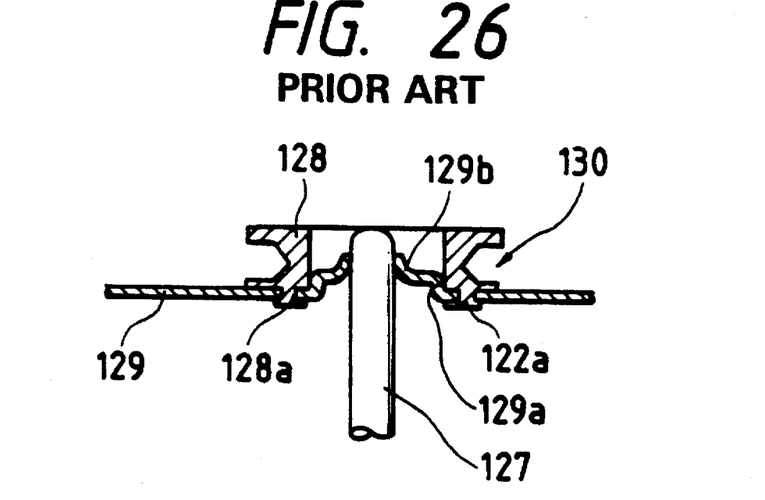
FIG. 26 is a cross-sectional view showing enlarged the essential part of another prior art motor.

Another example of the brushless capstan motor is shown in FIG. 26. As shown, a rotor case 129 in the form of a shallow cup is slightly raised in the central portion to provide an elevation 129a, which is also raised up in the center in a semielliptical form to provide an elevation 129b. A through-hole is formed in the center of the elevation 129b and a rotating shaft 127 is pressed into this through-hole. The outer circumference of the elevation 129a is in engagement with the inner circumference of the through-hole in the center of the pulley 128. As in the first example, a peripheral groove 130 is formed around the circumference of the pulley 128. A plurality of projections 128a are formed on the underside of the pulley 128 and inserted into through-holes formed in the top surface of the rotor case 129. The distal ends of the respective projections 128a that protrude beyond the through-holes are welded so that the pulley 128 is secured to the rotor case 129 to form an integral assembly. A belt (not shown) is stretched in a peripheral groove 130 in the pulley 128 and driven by causing the pulley to rotate as a member integral with the rotor case 129.

Speaking of the motor shown in FIG. 25, the part which secures the pulley 125 is composed of three members, the rotor case 121, the boss portion 124 and the rotating shaft 123. Since the errors in precision of these parts will add to each other, the pulley 125 may experience torsion relative to the rotating shaft 123, making it difficult to provide a motor having satisfactory rotating performance unless those parts are worked to significantly improved precision. If the pulley 125 experiences torsion, the belt will either vibrate or be driven at uneven speeds. A further problem with the torsion of the pulley is that the load on the belt tension fluctuates, causing the sliding characteristics of a sintered bearing 120 and the rotating shaft 123 to deteriorate with time. If such a defective motor is used on a video tape recorder and the like, various troubles will occur as exemplified by unevenness in the tape forwarding and reversing operations and the production of wows and flutters during video recording and reproducing operations.

To achieve satisfactory rotating performance with the motor shown in FIG. 26, the rotor case 129 must be worked to high precision. However, the rotor case 129 which is made by pressing is not easy to work with higher precision and if one attempts to increase the working precision, the production cost will increase. A further problem is caused by the fact that the areas of the pulley 128 where the projections 128a are welded to the rotor case 129 to fix the pulley 128 are located in a lower position than the area where the belt is stretched. On account of the tension as applied by the driven belt, the pulley 128 is constantly subjected to a force that works in the direction where the projections 128a will be disengaged from the rotor case 129 on the side where the belt is stretched, with the fulcrum lying at the projections 128a on the side where the belt is not stretched. Hence, the pulley 128 tends to experience deformation or torsion and troubles such as wows and flutters will occur. In the worst case, the pulley 128 will break, making is impossible for the video tape recorder and the like to work normally.

SUMMARY OF THE INVENTION

The present invention has been accomplished under these circumstances and has as an object providing a motor that is simple in construction and which enables the pulley to be mounted with high precision and which yet insures that the mounted pulley is less sensitive to external forces and the like.

According to a first aspect of the present invention, there is provided a motor comprising a rotor case having a rotor magnet so as to face a stator core; a rotating shaft as fixed through a hole formed in the center of the rotor case; and a pulley having a center hole fixedly secured to a distal end portion of the rotating shaft projecting beyond the hole in the rotor case, the pulley being fixed to the rotor case.

According to a second embodiment of the present invention, there is provided a motor comprising a stator member; a rotor member facing the stator member; a rotating shaft as fixed through a hole that is formed in the center of the rotor section; and a pulley having a center hole fixedly secured to a distal end portion of the rotating shaft projecting beyond the hole in the rotor case, the pulley including two members at least one of which is made of a metal.

According to a third embodiment of the present invention, there is provided a motor comprising a rotor case having a rotor magnet so as to face a stator core; a rotating shaft as fixed through a hole formed in the center of the rotor case; and a pulley having a center hole fixedly secured to a distal end portion of the rotating shaft projecting beyond the hole in the rotor case, the pulley being fixed to the rotor case, the pulley including two members at least one of which is made of a metal.

The motor of the present invention comprises a rotor case having a rotor magnet fixed in a face-to-face relationship with a stator core, a generally cylindrical hole formed in the center of the rotor case, a rotating shaft penetrating through the cylindrical hole to be fixed therein, and a pulley that has a center hole to be fixed in engagement with the distal end of the rotating shaft projecting beyond the cylindrical hole and which is eventually to be secured to the rotor case. Because of this arrangement, the pulley is directly positioned with respect to the rotating shaft, thereby enabling the pulley to be mounted on the rotor case with high precision. In addition, the pulley can be secured with higher strength since it is fixed not only in the area where the rotating shaft is pressed into it but also in the area where it is fixed to the rotor case. Further, the belt can be stretched between those two areas in an axially intermediate position to offer the advantage of rendering the pulley less vulnerable to damage under the application of an external force.

According to the present invention, the pulley is composed of two members and at least one of them is made from a metallic sheet that is pressed into a dish form. Hence, the present invention is capable of offering a motor pulley that is inexpensive and which yet has high precision, rigidity and conductivity. The contact resistance of the pulley can be increased or reduced by subsequent processing and, hence, it features a wide scope of applicability.

DETAILED DESCRIPTION OF THE PREFERRED EMBODIMENTS

Preferred embodiments of the present invention will now be described with reference to accompanying drawings.

First Embodiment

Figure 1:
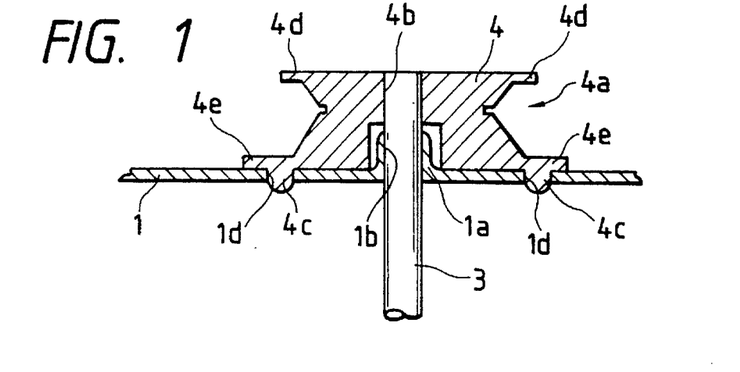
FIG. 1 is a cross-sectional view showing enlarged the essential part of a motor according to the first embodiment of the present invention.
Figure 2:
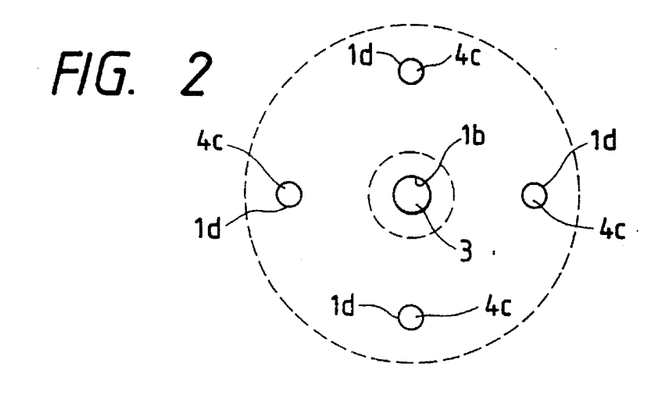
FIG. 2 is a bottom view of the part shown in FIG. 1.

As shown in FIG. 1, a rotor case 1 has an upwardly projecting cylindrical boss portion 1a formed in the center of the top surface by drawing. The boss portion 1a has a cylindrical hole 1b in the interior. As shown in FIG. 2, four holes 1d are formed around the cylindrical hole 1b formed in the rotor case 1. The four holes 1d are all formed in positions that are equidistant from the central cylindrical hole 1b; the positions of these four holes 1d are so set that a square is described when the vertices as provided by those holes are connected with straight lines. As shown in FIG. 1, a rotating shaft 3 is fixed in engagement with the cylindrical hole 1b in the boss portion 1a. A pulley 4 is secured by pressing, welding or some other suitable means on the rotating shaft 3 and above the boss portion 1a.

The pulley 4 has a through-hole 4b formed in the center. The through-hole 4b has a step in substantially the middle portion and it is so shaped that the upper part has a smaller diameter than the lower part. The upper small-diameter part of the through-hole 4b is in engagement with the rotating shaft 3 and the lower large-diameter part accommodates the rotating shaft 3 and the boss portion 1a in engagement with the shaft. A peripheral groove 4a having a rectangular cross section is formed on the outer circumference of the pulley 4, with a flange 4d formed in the upper part of the groove 4a and a flange 4e in the lower part. A clearance for the escape of an angular portion of the belt to be stretched in the groove 4a is formed in that part of the groove 4a which provides a vertex of the rectangular cross section. Four projections 4c are formed on the underside of the pulley 4 and they are pressed into, welded onto and otherwise secured to the corresponding holes 1d in the rotor case 1.

The rotor case 1 is in the form of a shallow cup and like the prior art example shown in FIG. 25, it is fitted with a rotor magnet on the inner surface of the peripheral wall. The rotor magnet faces the salient poles on the stator core with a certain clearance being provided. Therefore, if coils wound around the salient poles of the stator core are supplied with an electric current in a controlled manner, the rotor magnet is energized and the rotor case 1, the pulley 4 and the rotating shaft 3 will be driven to rotate. A belt (not shown)

is stretched in the peripheral groove 4a around the pulley 4 and it is driven in response to the rotational drive of the pulley 4.

The pulley can be mounted on the motor by the following procedure.

Figure 3:
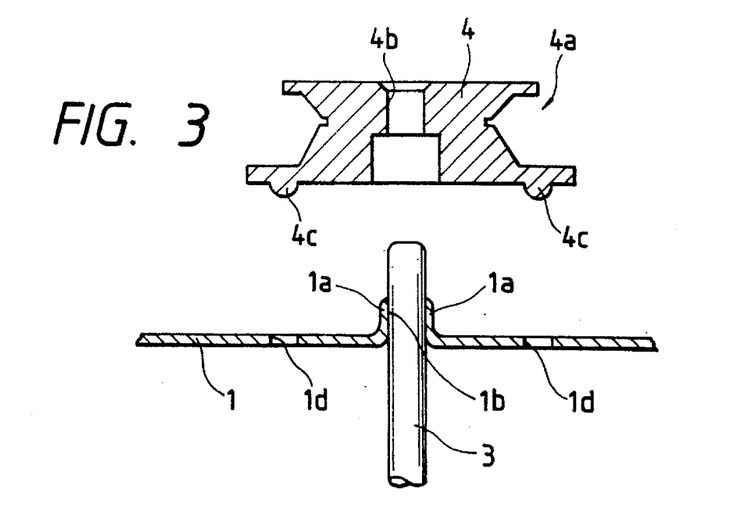
FIG. 3 is a cross-sectional view showing a step of the procedure for mounting an exemplary pulley on the motor shown in FIG. 1.

(1) First, place the pulley 4 above the rotor case 1 with the rotating shaft 3 inserted through the boss portion 1a (see FIG. 3). In this case, the projections 4c formed on the underside of the pulley 4 are positioned above the corresponding holes 1d in the top surface of the rotor case 1 whereas the through-hole 4b in the center of the pulley 4 is positioned above the rotating shaft 3.

Figure 4:
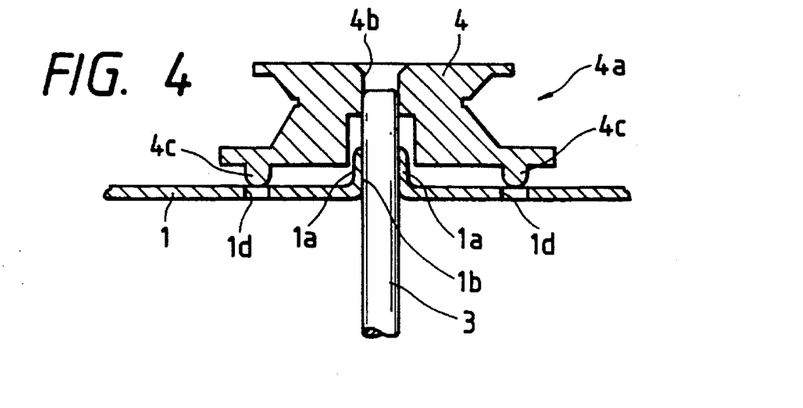
FIG. 4 is a cross-sectional view showing another step of the procedure for mounting the pulley on the motor shown in FIG. 1.

(2) Second, lower the pulley 4 and press the rotating shaft 3 into the small-diameter portion of the through-hole 4b (see FIG. 4). At this stage, the projections 4c formed on the underside of the pulley 4 are yet to be inserted into the holes 1d.

Figure 5:
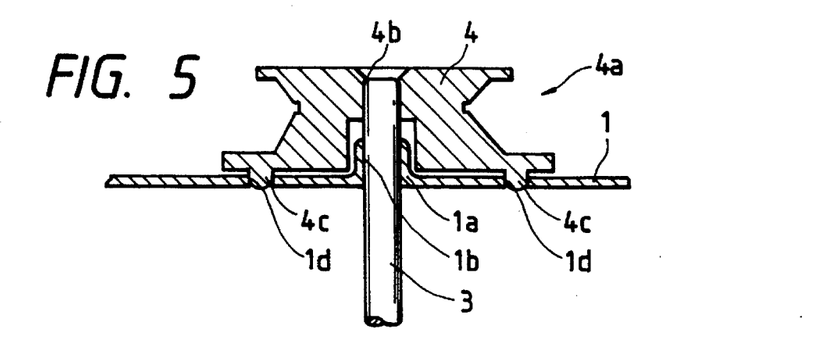
FIG. 5 is a cross-sectional view showing still another step of the procedure for mounting the pulley on the motor shown in FIG. 1.

(3) Further push down the pulley 4 so that the projections 4c are pressed into the holes 1d. When the underside of the pulley 4 comes in contact with the top surface of the rotor case 1, the mounting of the pulley 4 on the motor ends.

The motor according to the first embodiment of the present invention which is constructed in the manner described above has several advantages. First, the pulley 4 is lowered in such a way that the rotating shaft 3 is pressed into its center and, hence, the pulley 4 can be mounted on the rotating shaft 3 with higher precision. Second, the projections 4c on the underside of the pulley 4 are pressed into the holes 1d formed in the rotor case 1 and the projecting ends are secured to complete the process of mounting the pulley 4 on the rotor case 1; as a result, the strength of securing the pulley 4 is improved. Thirdly, the belt is stretched in a position intermediate in the axial direction of the rotating shaft 3 between the area where the shaft is pressed into the pulley 4 and the area where the pulley is pressed into the rotor case 1 and, hence, there is no possibility that the pulley 4 will accidentally come out of engagement with the rotor case 1. Therefore, no unevenness will occur in the speed of the rotating pulley 4 and the belt can be driven at constant speed without undue vibrations while producing reduced levels of wows and flutters. Fourthly, the only components that are needed to achieve the purpose of the present invention are the key parts such as the rotating shaft 3, rotor case 1 and pulley 4 and, therefore, the motor is fairly simple in construction and can be produced at a reasonably low cost.

Figure 10:
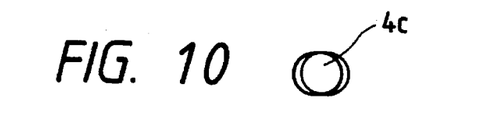
FIG. 10 is a plan view illustrating still another example of the hole that is to be formed in the rotor case of the motor shown in FIG. 1.

In the first embodiment under consideration, the holes 1d in the rotor case 1 into which the projections 4c on the pulley 4 are to be inserted are circular in shape as shown in FIG. 2. If desired, the holes 1d may be oblong toward the outer circumference of the rotor case 1 as shown in FIG. 10. The use of such oblong holes offers the advantage that when the pulley 4 is pressed into the rotor case 1, any offset between the two parts can be effectively absorbed to prevent unwanted deformation of the pulley 4.

Figure 6:
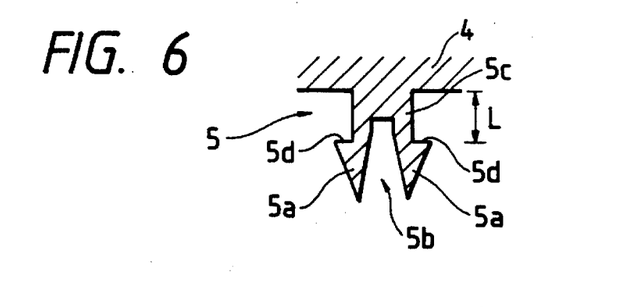
FIG. 6 is a cross-sectional view showing enlarged the essential part of another example of the pulley that is to be applied to the motor shown in FIG. 1.

In the first embodiment, the projections 4c formed on the underside of the pulley 4 are semielliptic in shape but this is not the sole case of the present invention. Another example of the projection to be formed on the underside of the pulley 4 is shown in FIG. 6 as indicated by 5. The projection 5 consists of a bifurcate head 5a and a base 5c; the head 5a has a cutout 5b in the distal end to be provided with springiness, and the base 5c connects the head 5a to the pulley 4. The length L of the base 5c is set to be equal to the thickness of the rotor case 1 whereas the diameter of the base 5c is set to be equal to the diameter of each hole 1d in the rotor case 1. The part of the head 5a which is the closest to the base 5c forms a flat portion 5d that extends outward beyond the base 5c. The advantage of the projection 5 having the above-described shape is that when it is inserted into one of the holes 1d in the rotor case 1, bifurcate head 5a is contracted on account of its own springiness and because of contact with the peripheral edge of the hole 1d, whereby it can be readily inserted into the hole 1d. After being inserted into the hole 1d, the bifurcate head 5a expands on account of its own springiness and the flat portion 5d will come in contact with the reverse side of the rotor case 1 (opposite the side where the pulley 4 is mounted), thereby preventing the projection 5 from slipping out of the hole 1d. Furthermore, the length L of the base 5c is set to be equal to the thickness of the rotor case 1 whereas the diameter of the base 5c is set to be equal to the diameter of the hole 1d; hence, the inserted projection 5 is firmly secured without rattling.

Figure 7:
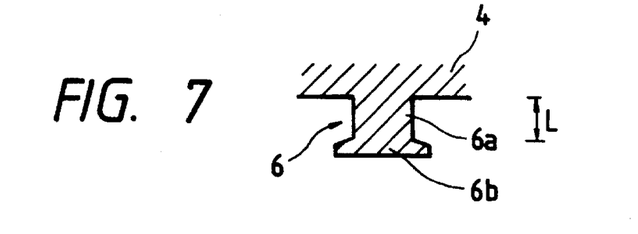
FIG. 7 is a cross-sectional view showing enlarged the essential part of still another example of the pulley that is to be applied to the motor shown in FIG. 1.
Figure 9:
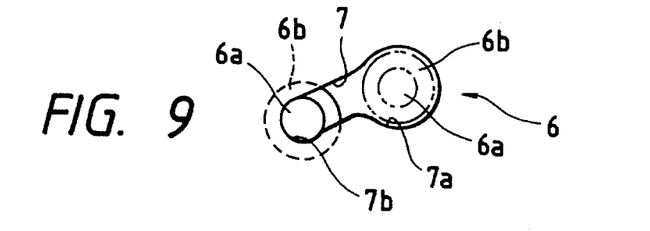
FIG. 9 is a plan view illustrating another example of the hole that is to be formed in the rotor case of the motor shown in FIG. 1.

FIG. 7 shows another example of the projection that can be formed on the underside of the pulley 4. The projection indicated by 6 in FIG. 7 consists of a cylindrical base 6a and a head 6b at the distal end that extends laterally beyond the head 6b. To fix this projection 6 in position, it is first inserted into a hole 7 that is formed in the rotor case a shown in FIG. 9. The hole 7 shown in FIG. 9 consists of a comparatively large circular hole 7a that is connected to an oblong hole 7b shaped like an arc of a circle at an end. The circular hole 7a is large enough to permit the insertion of the head of the projection 6. The projection 6 is first inserted into the circular hole 7a as indicated by a tow-short-one-long dashed line and then rotated to slide to the oblong hole 7b, in which it is fixed in intimate contact with the rotor case. The arcuate portion of the oblong hole 7b has a smaller diameter than the head 6b of the projection 6. It should also be noted that the length L of the base 6a of the projection 6 is set to be equal to the thickness of the rotor case 1.

Figure 8:
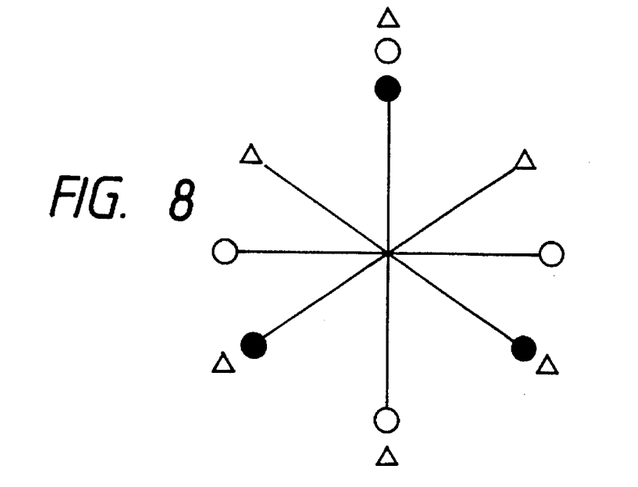
FIG. 8 is a plan view illustrating various patterns for arranging holes that are to be formed in the rotor case of the motor shown in FIG. 1.

The arrangement of the holes 1d to be formed in the rotor case 1 is not limited to the case of the first embodiment described above and they can be arranged in any suitable way depending upon the tension of the belt. If six holes 1d are to be formed, they may be arranged in such a way that an equilateral hexagon is described by connecting the holes 1d with straight lines as marked by white triangles in FIG. 8. If three holes 1d are to be formed, they may be arranged in such a way that an equilateral triangle is described by connecting the holes 1d with straight lines as marked by solid circles.

Second Embodiment

Figure 11:
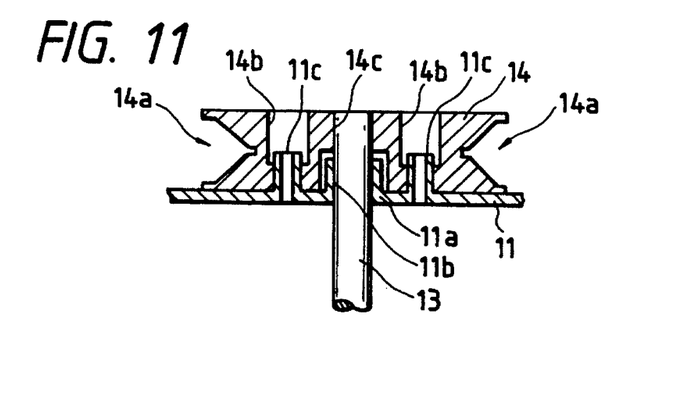
FIG. 11 is a cross-sectional view showing a motor pulley and rotor case according to the second embodiment of the present invention.
Figure 12:
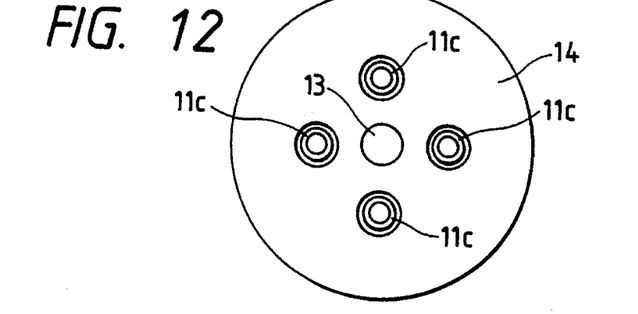
FIG. 12 is a bottom view of the part shown in FIG. 11.

The second embodiment of the present invention relates to the case where projections that are formed on the rotor case and holes that are formed in the pulley are brought into mutual engagement so as to fix the two members in position. Referring to FIGS. 11 and 12, a rotor case 11 has an upwardly projecting cylindrical boss portion 11a formed in the center of the top surface by drawing as in the case of the first embodiment, as the boss portion 11a has a cylindrical hole 11b in the interior. Four cylindrical projections 11c are formed around the cylindrical hole 11b. The four projections 11c are formed in positions that are equidistant from the central cylindrical hole 11b; the positions of these four holes 11c are so set that a square is described when the vertices as provided by those holes are connected with straight lines. A rotating shaft 13 is fixed in engagement with the cylindrical hole 11b in the boss portion 11a. A pulley 14 is secured by pressing, welding or some other suitable means around the rotating shaft 13 and above the boss portion 11a.

The pulley 14 has a through-hole 14c formed in the center. The through-hole 14c has a step in substantially the middle portion in such a way that the upper part has a smaller diameter than the lower part. The upper small-diameter part of the through-hole 14c is in engagement with the rotating shaft 13 and the lower large-diameter part accommodates not only the rotating shaft 13 but also the boss portion 11a in engagement with the shaft. A peripheral groove 14a having a rectangular cross section is formed on the outer circumference of the pulley 14, with a flange being formed in both the upper and lower parts of the groove 14a. A clearance for the escape of a corner of the belt to be stretched in the groove 14a is formed in that part of the groove 14a which provides a vertex of the rectangular cross section.

Four holes 14b are formed around the through-hole 14c in the pulley 14 into which the rotating shaft 13 is to be fitted. Each hole 14b penetrates the pulley 14 and has a step in the middle in such a way that the lower part has a smaller diameter than the upper part. Each of the projections 11c formed on the rotor case 11 is pressed into or welded onto the lower small-diameter part of the corresponding hole 14b, whereby the pulley 14 is secured to the rotor case 11.

Third Embodiment

Figure 13:
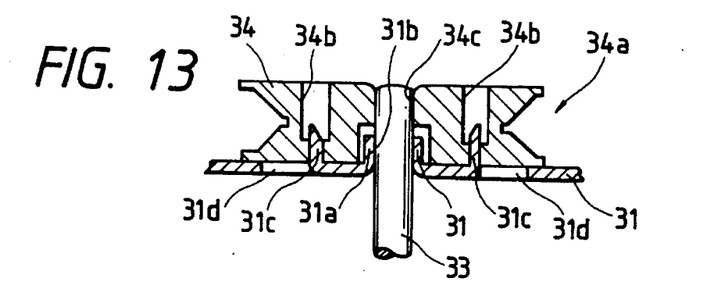
FIG. 13 is a cross-sectional view showing a motor pulley and rotor case according to the third embodiment of the present invention.
Figure 14:
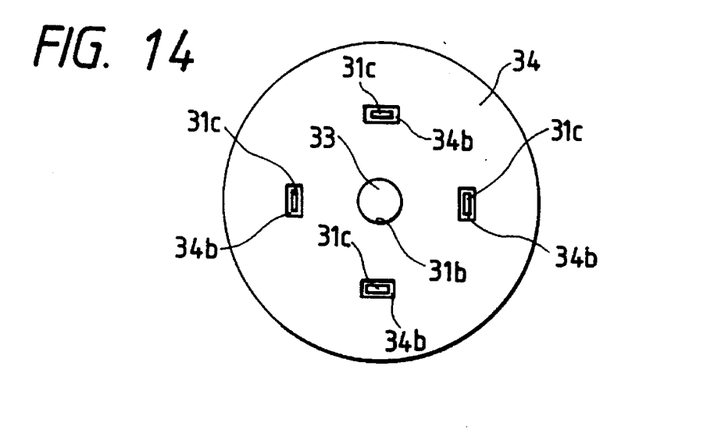
FIG. 14 is a bottom view of the part shown in FIG. 13.
Figure 15:
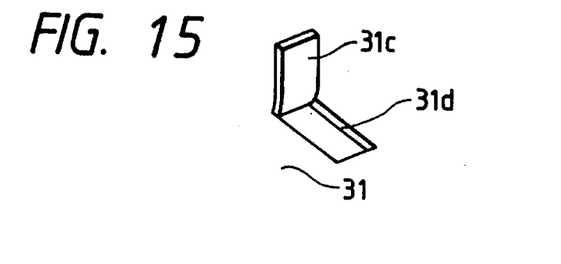
FIG. 15 is a perspective view showing enlarged the essential part of the rotor case shown in FIG. 13.

Third embodiment of the present invention is described below with reference to FIGS. 13 and 14. A rotor case 31 has an upwardly projecting cylindrical boss portion 31a formed in the center of the top surface by drawing, and the boss portion 31a has a cylindrical hole 31b in the interior. As shown in FIG. 15, the top surface of the rotor case 31 is cut and bent in selected areas around the cylindrical hole 31b to form rectangular projections 31c. Thus, rectangular holes 31d are left in the areas where the projections 31c have been cut and bent. In the case shown in FIGS. 13 and 14, the projection 31c is formed in four areas of the rotor case 31. A rotating shaft 33 is fixed in engagement with in the cylindrical hole 31b in the boss portion 31a. A pulley 34 is pressed, welded or otherwise secured around the rotating shaft 33 and above the boss portion 31a.

The pulley 34 has a through-hole 34c formed in the center. As in the first and second embodiments, the through-hole 34c has a step in substantially the middle portion in such a way that the upper part has a smaller diameter than the lower part. The upper small-diameter portion of the through-hole 34c is in engagement with the rotating shaft 33 and the lower large-diameter part accommodates not only the rotating shaft 33 but also the boss portion 31a in engagement with the shaft. A peripheral groove 34a having a rectangular cross section is formed on the outer circumference of the pulley 34, with a flange being formed in both the upper and lower parts of the groove 34a. Four holes 34b are formed around the through-hole 34c in the pulley 34 into which the rotating shaft 33 is to be fitted. The holes 34b which are rectangular in shape penetrate the pulley 34 and each of them has a step in an area substantially in the middle of the axial direction in such a way that the lower portion is smaller in size than the upper portion. Each of the projections 31c formed on the rotor case 31 is pressed into or welded onto the lower small-size portion of the corresponding hole 34b, whereby the pulley 34 is secured to the rotor case 31.

As described above, the second and third embodiments of the present invention are such that the holes formed in the pulley and the projections formed on the rotor case are brought into mutual engagement to have the two members fixed to each other. The strength of securing the two members that is attained in these embodiments is as satisfactory as in the first embodiment where the projections formed on the pulley and the holes formed in the rotor case are brought into mutual engagement. The shapes of the projections and holes formed in the second and third embodiments are in no way limited to those shown in FIGS. 11 to 15 and optimal shapes may be selected in accordance with the shape and size of the motor to be constructed. It should also be mentioned that the arrangement of the holes to be formed in the rotor case is in no way limited and any arrangements may be selected depending upon the tension of the belt.

The motor of the present invention comprises a rotor case having a rotor magnet fixed in a face-to-face relationship with a stator core, a generally cylindrical hole formed in the center of the rotor case, a rotating shaft penetrating through the cylindrical hole to be fixed therein, and a pulley that has a center hole to be fixed in engagement with the distal end of the rotating shaft projecting beyond the cylindrical hole and which is eventually to be secured to the rotor case. Because of this arrangement, the pulley is directly positioned with respect to the rotating shaft, thereby enabling the pulley to be mounted on the rotor case with high precision. In addition, the pulley can be secured with higher strength since it is fixed not only in the area where the rotating shaft is pressed into it but also in the area where it is fixed to the rotor case. Further, the belt can be stretched between those two areas in an axially intermediate position and this offers the advantage of rendering the pulley less vulnerable to damage under the application of an external force.

Fourth Embodiment

A motor pulley according to the fourth embodiment of the present invention is described below with reference to accompanying drawings. The fourth embodiment is different from the above-described first to third embodiments in that the pulley is composed of two members (the first and the second member), at least one of which is made of a metal.

Figure 16:
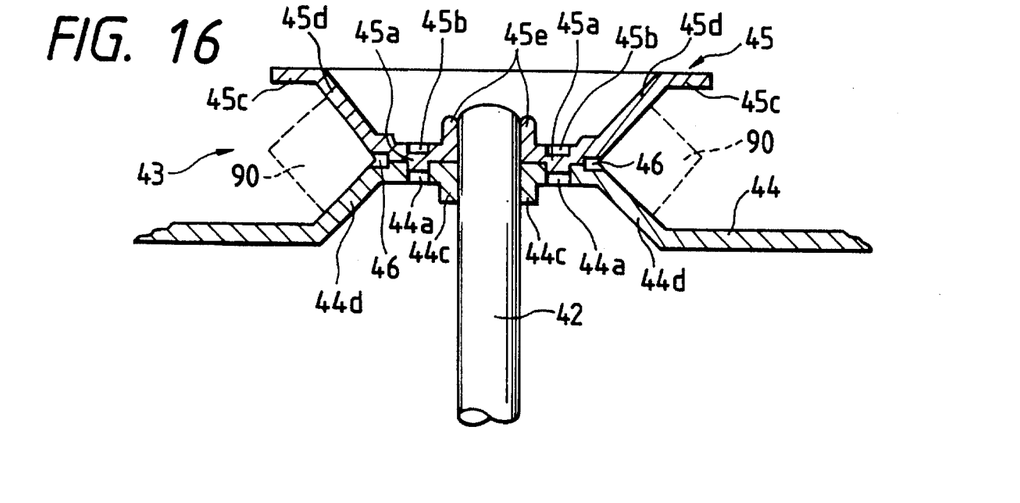
FIG. 16 is a cross-sectional view showing a motor pulley according to the fourth embodiment of the present invention.
Figure 17:
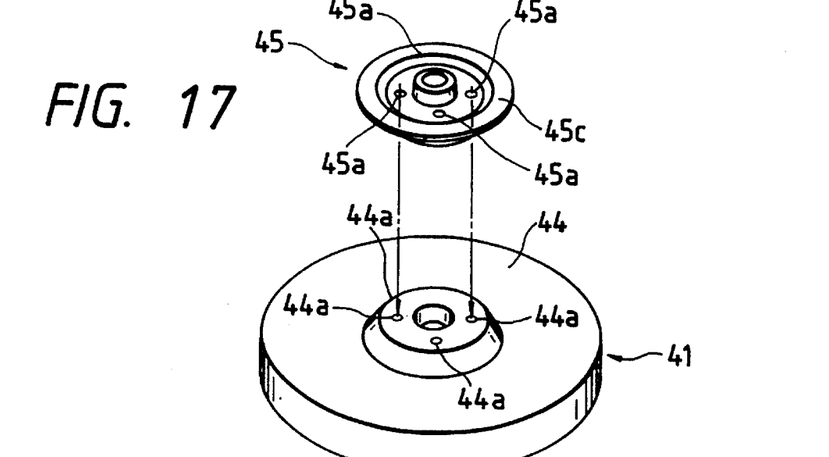
FIG. 17 is an exploded perspective view of the motor pulley shown in FIG. 16.
Figure 18:
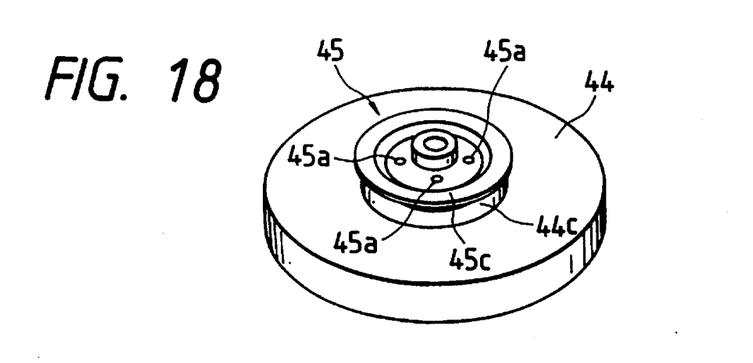
FIG. 18 is a perspective view of the motor pulley shown in FIG. 16.

As shown in FIGS. 16 to 18, a metallic rotor case 44 has an upwardly projecting conical portion 44d formed in the center, and this elevation 44d has a cylindrical boss portion 44c formed downward in the center. A rotating shaft 42 is pressed into the center of the boss portion 44c; the shaft 42 is formed as an integral part of the rotor case 44. The elevation 44d has a plurality of through-holes 44a formed around the boss portion 44c. The elevation 44d also serves as the second member of the pulley.

The top of the projecting part 44d of the rotor case 44 is fitted with the first member 45 of the pulley which is in the form of a dish. The central part of the first member 45 forms a downwardly projecting cone 45d and the other part of the first member provides a plane-surfaced flange 45c. The projecting conical part 45d has a cylindrical boss portion 45e formed in the center by burring and a rotating shaft 42 is pressed into the center of the boss portion 45e. The conical elevation 45d has a plurality of projections 45a formed around the boss portion 45e in positions that correspond to the through-holes 44a in the rotor case 44, and these projections 45a are pressed into the through-holes 44a.

The first member 45 of the pulley is attached and secured to the projecting part 44d of the rotor case 44 which also serves as the second member of the pulley, whereby the two members (i.e., the rotor case 44 and the first member 45) combine to form the pulley on motor. A peripheral groove 43 having a rectangular cross section is formed on the outer circumference of the pulley by the slopes of the upper projection 45d and the lower projection 44d. A corresponding rectangular belt 90 is stretched in the groove 43. The belt 90 that is stretched in the peripheral groove 43 around the pulley is positioned in such a way that two adjacent inner sides with the inner angular portion forming the borderline are in contact with the conical surfaces of the projections 44d and 45d which define the peripheral groove 43. In order to permit inward escape of an angular portion of the belt 90, a clearance 46 is formed exterior to the area of contact between the adjacent surfaces of the projections 45*d* and 44*d*. When the shaft 42 rotates, the pulley that is composed of the first member 45 and rotor case 44 which are integral with the rotating shaft 42 also rotates, whereupon the belt 90 which is stretched in the peripheral groove 43 on the pulley is driven to rotate.

The pulley on the motor according to the fourth embodiment under consideration is formed by the following procedure.

(1) Blank a flat metal plate with a general-purpose pressing machine or the like to form the first member 45 as a flat disk. The thus formed first member 45 may be knurled or given a coat as required.

(2) Press the central part of the first member 45 to form the downwardly projecting cone 45*d*.

(3) Press the bottom surface of the cone 45*d* to form a plurality of projections 45*a* on the underside of the cone 45*d*.

(4) Punch the center of the cone 45*d* with a press to form a through-hole.

(5) Press the projections 45*a* on the first member 45 into the through-holes 44*a* in the top surface of the metallic rotor case 44 and crimp the projecting ends, thereby securing the first member 45 to the rotor case so as to complete the pulley on motor.

The motor pulley having the construction described above is characterized in that both the first member 45 and the rotor case 44 which are the two major components are metallic and, hence, have good electric conductivity. Therefore, the pulley will produce no static charges upon friction with the belt 90 and any static charges that might be generated can be conducted to the outside. Hence, no foreign material such as dust particles scattering in air will be adsorbed on the pulley or belt. The first member 45 can be formed by a general purpose pressing machine and, hence, it can be prepared at low cost and with high precision. As a further advantage, the first member 45 which is made of a metal insures satisfactory strength and contributes to the manufacture of a motor pulley of good quality that is free from cracks and other defects. In addition, the first member 45 is formed by pressing and, hence, its contact resistance can be increased or reduced by subsequent processing; hence, the single first member can be used for various purposes.

Both the first member 45 and the rotor case 44 (the second member of the pulley) are press-fitted over the rotating shaft 42 and, hence, the precision of vibration is improved with respect to the shaft.

Fifth Embodiment

A motor pulley according to the fifth embodiment of the present invention is described below.

Figure 19:
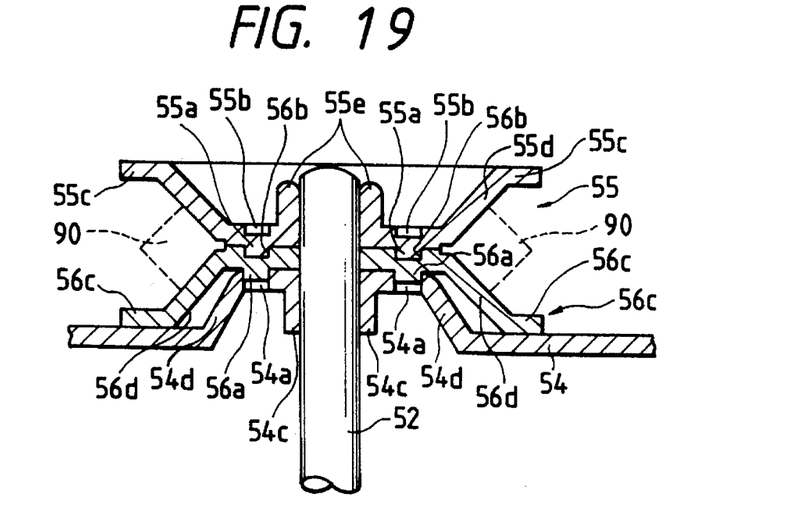
FIG. 19 is a cross-sectional view showing a motor pulley according to the fifth embodiment of the present invention.

Referring to FIG. 19, a metallic rotor case 54 has a central projecting portion 54*d*, which has a cylindrical boss portion 54*c* formed in the center. A rotating shaft 52 is pressed into the center of the boss portion 54*c* to become an integral part of the rotor case 54. The projecting part 54*d* has a plurality of through-holes 54*a* formed around the boss portion 54*c*. The first member 55 and the second member 56, both of which are shaped like a dish, are mounted on top of the projecting part 54*d* of the rotor case 54. The first and second members 55 and 56 are superposed in a bottom-to-bottom relationship to provide a cross section that is generally shaped like the letter X in a partly crushed form. The so combined first and second members constitute a motor pulley.

The first member of the pulley which is the upper half of the device shown in FIG. 19 forms a downwardly projecting cone 55*d* and the other part of the fist member provides a plane-surfaced flange 55*c*. The projecting conical part 55*d* has an upwardly projecting cylindrical boss portion 55*e* formed on the central surface by burring. The underside of the projecting part 55*d* is provided with a plurality of projections 55*a* in areas that correspond to recesses 56*b* that are formed in the second member 56 of the pulley to be described just below.

The second member of the pulley 56 which is the lower half of the device shown in FIG. 19 forms an upwardly projecting cone 56*d* and the other part of the second member provides a plane-surfaced flange 56*c*. The projecting cone 56 has a through-hole formed in the central surface. The through-hole has the same inside diameter as the boss portion 55*e* of the first member 55 and both the first and second members are to be press-fitted over the rotating shaft 52 and fixed in position. The plane-surfaced portion of the projecting cone 56*d* has a plurality of circular recesses 56*b* formed around the rotating shaft 52.

Figure 20:
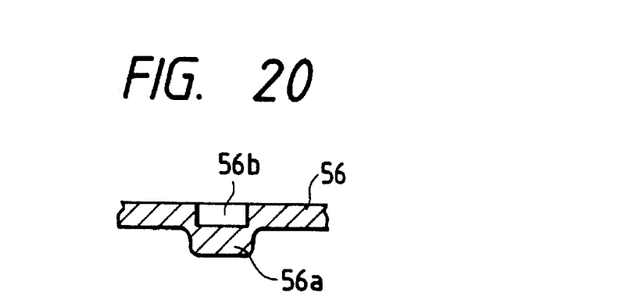
FIG. 20 is a cross-sectional view showing enlarged the essential view of the motor pulley shown in FIG. 19.

The side of the plane-surfaced portion which is opposite the side provided with the recesses 56*b* has projections 56*a* that protrude downward as shown in FIG. 20.

The projections 55*a* on the first member 55 of the pulley are formed in positions that correspond to the recesses 56*b* in the second member 56 and the former are fixed within the latter by a suitable technique such as pressing, crimping or spot welding. The projections 56*a* on the side facing away the recesses 56*b* are fixed within the through-holes 54*a* in the rotor case 54 by pressing, crimping or some other technique.

The motor pulley according to the fifth embodiment under consideration is formed by the following procedure.

Figure 21:
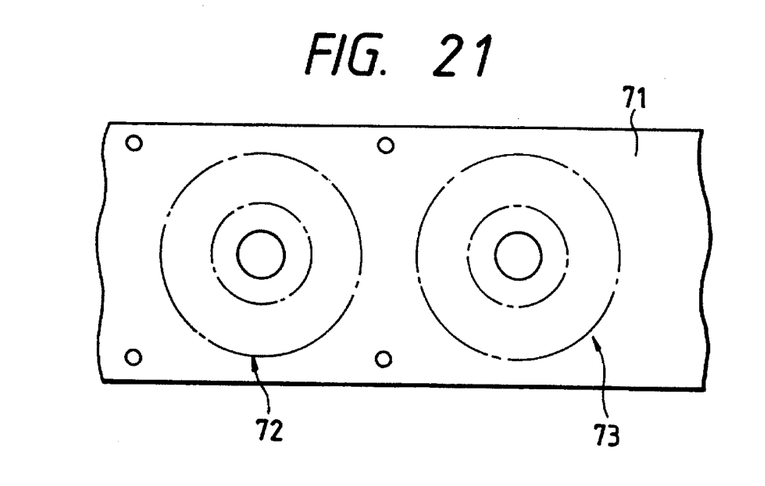
FIG. 21 is a plan view showing a blank as punched in the process for the manufacture of the motor pulley shown in FIG. 19.
Figure 22:
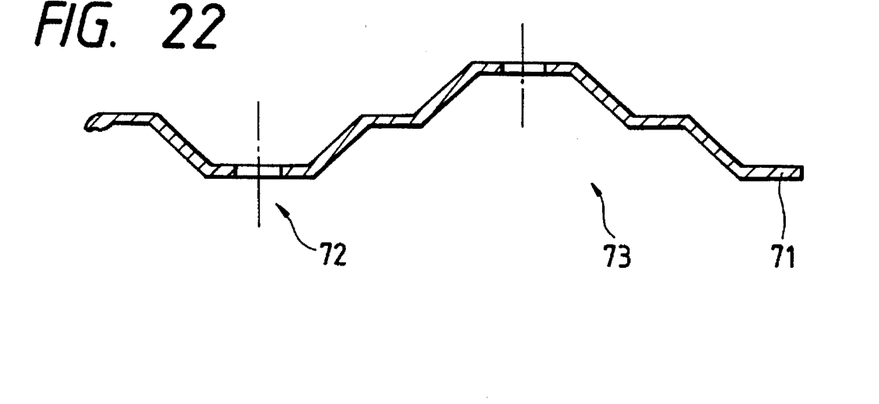
FIG. 22 is a cross-sectional view of the blank shown in FIG. 21.

(1) Press a flat metal sheet 71 to form two alternating elevations on the same sheet. One elevation 72 faces down and will provide the upper half of the pulley in a subsequent step and the other elevation 73 faces up and will provide the lower half of the pulley in a subsequent step.

(2) Press a mold against the bottom faces of the elevations 72 and 73 which have been formed in opposite directions on the same metallic sheet, thereby forming a plurality of projections. The projections formed on the elevation 72 which is to provide the upper half of the pulley face in the same direction as the protrusion of that elevation, whereas the projections formed on the elevation 73 which is to provide the lower half of the pulley face in the opposite direction to the protrusion of that elevation. Each of the two elevations 72 and 73 has a through-hole formed in the central part of the bottom surface.

(3) After working the elevations 72 and 73 in step (2), punch out the elevation 73 which is to provide the lower half of the pulley, thereby making the second member 56. Retain the second member 56 beneath the sheet 71.

Figure 23:
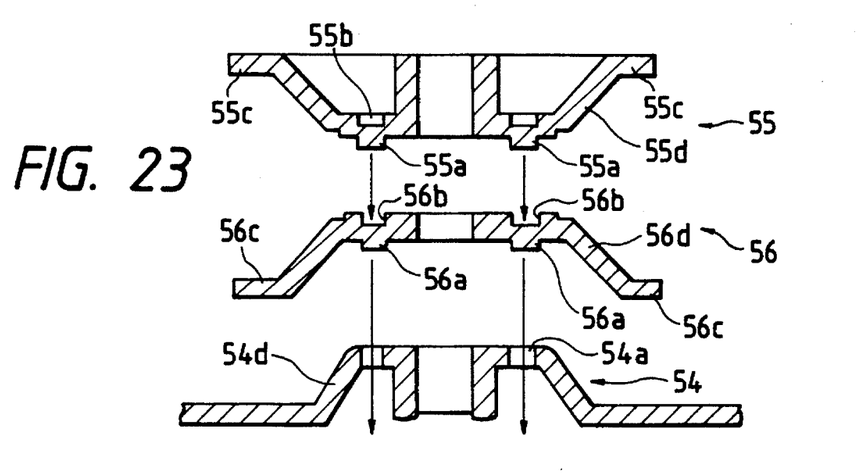
FIG. 23 is an exploded view showing in cross section the motor pulley according to the fifth embodiment of the present invention.

(4) Thereafter, punch out the elevation 72 to make the first member 55 and place it on top of the second member 56 as the latter is retained beneath the sheet 71 in such a way that the projections 55*a* will be brought into a face-to-face relationship with the recesses 56*b* in the second member 56 (see FIG. 23).

(5) Exert pressure on the superposed first and second members 55 and 56 so that the projections 55*a* are pressed into the recesses 56*b* and fixed therein to produce a motor pulley. Thereafter, press the projections 56*a* on the second member 56 into the through-holes 54*a* in the rotor case 54 so that the pulley is mounted on top of the rotor case.

As in the fourth embodiment, the rotor case of the motor in the fifth embodiment is metallic and, hence, has good electric conductivity. Therefore, the rotor case will produce no static charges upon friction with the belt and any static charges that might be generated can be conducted to the outside. Hence, no foreign matter such as dust particles scattering in air will be adsorbed on the rotor case. Further, the first and second members 55 and 56 of the pulley are formed by a general-purpose pressing machine and, hence, they can be prepared at low cost and with high precision. What is more, these members which are made of a metal insure satisfactory strength and render the pulley more resistant to cracking and other defects; the prepared pulley is uniform in shape and assures satisfactory quality. In addition, the first and second members 55 and 56 of the pulley are formed by pressing and, hence, their contact resistance can be increased or reduced by subsequent processing; hence, those parts can be used for more than one purpose.

Figure 24:
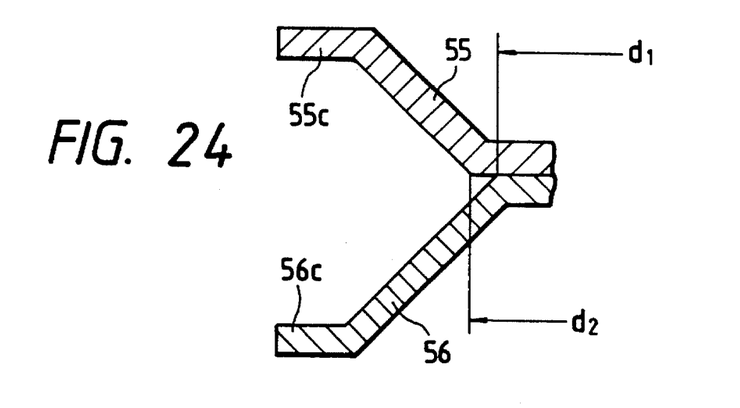
FIG. 24 is a cross-sectional view showing enlarged the essential part of another example of the motor pulley according to the fifth embodiment of the present invention.

If desired, the diameter (d2) of the bottom of the first member 55 (forming the upper half of the pulley) from which the conical elevation starts to slope upward may be set to be larger that the diameter (d1) of the bottom of the second member 56 (forming the lower half of the pulley) from which the conical elevation starts to slope downward. This design offers the advantage that the area corresponding to the difference between d1 and d2 can be used as the clearance for permitting the escape of an angular portion of the belt. In other wards, there is no need to provide a special clearance for permitting the escape of an angular portion of the belt and this leads to a further reduction in production cost. The relationship between d1 and d2 may be reversed (d1<d2).

The applicability of the present invention is not limited to capstan motors in video tape recorders and the like and the motor pulley of the invention is also effective in audio & visual (AV) equipment and other devices that require electric conductivity for pulleys.

The fourth and fifth embodiments of the present invention as described on the foregoing pages relate to the case where the rotating shaft of a motor penetrates through both the first and second members of the pulley. If desired, the rotating shaft may be so adapted that it penetrates through the center hole in the second member of the pulley but that its distal end comes in contact with the central part of the first member.

According to the present invention, the pulley is composed of two members and at least one of them is made from a metallic sheet that is pressed into a dish form. Hence, the present invention is capable of offering a motor pulley that is inexpensive and which yet has high precision, rigidity and conductivity. The contact resistance of the pulley can be increased or reduced by subsequent processing and, hence, it features a wide scope of applicability.

What is claimed is:

1. A motor comprising:

a rotor case having a rotor magnet confronted to a stator core:

a rotating shaft extending through a hole formed in the center of the rotor case, said shaft being fixed to said hole;

a pulley having a center hole fixedly secured directly to a distal end portion of the rotating shaft projecting beyond the hole in the rotor case, the pulley being fixed to the rotor case; and holding means for holding the pulley on the rotor case, the holding means being provided by the rotor case and the pulley.

2. A motor as claimed in claim 1, wherein the holding means has at least one projection which is provided on the pulley and at least one hole which is provided on the rotor case, wherein said at least one projection is engaged with said at least one hole.

3. A motor as claimed in claim 1, wherein the holding means has at least one cylindrical projection and at least one cylindrical hole, wherein aid at least one cylindrical projection is inserted into said at least one cylindrical hole.

4. A motor as claimed in claim 1, wherein the holding means has at least one plate shaped projection and at least one hole, and the plate shaped projection is inserted into the hole.

5. A motor as claimed in claim 1 wherein the hole which is formed in the center of the rotor case is generally cylindrical in shape.

6. A motor as claimed in claim 1 wherein the rotor case has a plurality of holes and projections formed in positions which are equidistant from the hole which is formed in the center of the rotor case.

7. A motor as claimed in claim 6 wherein distances between adjacent holes and adjacent projections of said rotor case are equidistant.

8. A motor as claimed in claim 6 wherein the plurality of holes are oblong.

9. A motor as claimed in claim 6 wherein the pulley has a plurality of projections and holes formed in such a manner that at least one of the projections and the holes of said pulley are to be fixed in engagement with at least one of the holes and projections which are formed in said rotor case.

10. A motor as claimed in claim 9, wherein distance between adjacent holes and adjacent projections of said pulley are equidistant.

11. A motor comprising:

a stator member;

a rotor member facing the stator member;

a rotating shaft fixedly secured to a hole that is formed in the center of the rotor member; and a pulley having a center hole fixedly secured directly to a distal end portion of the rotating shaft projecting beyond the hole in the rotor member, the pulley including two members at least one of which is made of a metal.

12. A motor as claimed in claim 11 wherein at least one of the members of the pulley is made from a metallic sheet which is pressed in a dish form.

13. A motor comprising:

a rotor case having a rotor magnet so as to face a stator core;

a rotating shaft as fixed through a hole formed in the center of the rotor case; and a pulley having a center hole fixedly secured directly to a distal end portion of the rotating shaft projecting beyond the hole in the rotor case, the pulley being fixed to the rotor case, the pulley including two members at least one of which is made of a metal.

14. A motor as claimed in claim 13 wherein at least one of the members of the pulley is made from a metallic sheet that is pressed in a dish form.

15. A motor as claimed in claim 13 wherein at least one of the members of the pulley is the rotor case.

16. A motor comprising:

a rotor case having a rotor magnet confronted to a stator core:

a rotating shaft extending through a hole formed in the center of the rotor case;

a pully having a center hole fixedly secured to a distal end portion of the rotating shaft projecting beyond the hole in the rotor case, the pulley being fixed to the rotor case; and holding means for holding the pulley on the rotor case, the holding means being provided by the rotor case and the pulley, wherein the rotor case has a plurality of holes and projections formed in positions which are equidistant from the hole which is formed in the center of the rotor case, and the plurality of holes are oblong.

17. A motor comprising:

a rotor case having a rotor magnet so as to face a stator core;

a rotating shaft as fixed through a hole formed in the center of the rotor case; and a pulley having a center hole fixedly secured to a distal end portion of the rotating shaft projecting beyond the hole in the rotor case, the pulley being fixed to the rotor case, the pulley including two members at least one of which is made of a metal, wherein at least one of the members of the pulley is the rotor case.

* * * * *